Patented Oct. 27, 1953

2,657,190

UNITED STATES PATENT OFFICE 2,657,190

BLENDS OF POLYBUTADIENE AND BUTADIENE-ACRYLONITRILE COPOLYMER

Fred W. Banes, Westfield, Albert M. Gessler, Cranford, and Wilbur F. Fischer, Roselle Park, N. J., assignors to Standard Oil Development Company, a corporation of Delaware No Drawing. Application October 1, 1948, Serial No. 52,422

4 Claims. (Cl. 260—41.5)

This invention relates to improved synthetic rubber compositions and to methods of preparing such compositions. More particularly the invention relates to blends of rubbery diolefin-nitrile copolymers with rubbery, solid, polymers of diolefin hydrocarbons.

Rubbery copolymers of a diolefin such as butadiene with a nitrile such as acrylonitrile have been known in the art for many years and have established their place in industry as a specialty rubber wherever resistance to hydrocarbon solvents or oils was required along with true rubber-like properties including thermoplasticity in the uncured stage and ability to vulcanize with sulfur to form strong, flexible and elastic products. These diene-nitrile copolymers have also been known for their excellent abrasion resistance which makes them, by themselves or in admixture with other high polymeric compounds, or with fillers, particularly suitable for resilient articles such as shoe soles, conveyor belts, oil-resistant hose, etc.

However, although the processing characteristics of these rubbers can be improved somewhat by increasing the nitrile content at the expense of reducing their rubbery properties, even when containing as much as 37 percent of combined nitrile, these diene-nitrile polymers have the disadvantage of requiring undesirably large amounts of power and time in processing on compounding mills and extruders because of their relatively unfavorable processing characteristics as indicated by excessive mastication time and banding time, and concomitant excessive energy consumption for example. Moreover, these polymers are also known for their lack of tack, which deficiency has been serious enough to prevent their use in articles requiring lamination of several plies, such as automobile tires, gasoline hose, etc., for which the diene-nitrile polymers would otherwise be unusually well-suited because of their high resistance to liquid hydrocarbons, favorable abrasion resistance and generally excellent rubber-like properties.

It is the object of the invention to overcome the aforementioned disadvantages of the diene-nitrile copolymers without impairing their characteristically high solvent resistance and their otherwise excellent mechanical properties. Another object of the invention is to prepare more easily processable blends of the diene-nitrile polymers with non-bleeding, non-extractable high molecular weight plasticizers which are co-vulcanizable with the principal polymer so as to result in vulcanizates of unimpaired oil resistance and tensile strength. Still other objects will become apparent from the following description.

It has now been discovered that the aforementioned and other objects can be accomplished in a very surprising manner, namely by blending the diene-nitrile polymers with solid rubbery diolefin polymers, also referred to herein as polydiene rubbers, which by themselves are even more difficult to process than the said diene-nitrile polymers.

As is well known, the diene-nitrile copolymers are prepared by copolymerizing in aqueous emulsion about 85 to 50 parts by weight of a conjugated diolefin having 4 to 6 carbon atoms, such as butadiene, isoprene, piperylene, or dimethyl butadiene, or chloroprene, or a mixture thereof with about 15 to 50 parts by weight of an acrylic acid nitrile such as acrylonitrile, methacrylonitrile, ethacrylonitrile, chloracrylonitrile or mixtures thereof. The preferred monomers are butadiene and acrylonitrile and are most commonly used in a proportion of about 20 to 40 parts by weight of nitrile to about 80 to 60 parts by weight of diolefin.

The monomers are emulsified in about 50 to 400, preferably 150 to 250 parts of aqueous medium such as water per 100 parts of total monomers. Any of a great variety of emulsifying agents is suitable for this purpose. Most commonly about 0.5 to 5 parts of an alkali soap of a saturated or unsaturated $C_8$ to $C_{24}$ higher fatty acid such as caprylic, carnaubic, lauric or mixed coconut oil acids are used, sodium or potassium oleate or stearate, or the corresponding ammonium soaps being usually preferred. Often it is desirable to have a slight excess of free fatty acid or free alkali in the emulsion. For example, the soap may be prepared in situ by neutralizing oleic acid by nine-tenths of an equivalent of sodium hydroxide. In addition to or in place of the fatty acid soap, another emulsifier such as Daxad–11 (a formaldehyde condensation product of naphthalene sulfonic acid) or sodium lauryl sulfate, sodium tetraisobutylene sulfonate, or aromatic alkyl sulfonate salts, etc., may be used to advantage. 0.5 to 1.5 parts of a primary or tertiary aliphatic mercaptan having at least 6 and up to about 18 carbon atoms, e. g., dodecyl mercaptan or its commercial mixture comprising a major proportion of dodecyl with minor amounts of other mercaptans in the $C_6$ to $C_{18}$ range, or other modifiers such as diisopropyl dixanthogen disulfide are likewise beneficially present to modify the polymerization so as to obtain polymers of lower Mooney viscosity.

All of the mercaptan may be added to the emulsion initially although it is preferred that additions of mercaptan be made to the systems in increments, e. g., at 20 to 25 percent and at 45 to 50 percent overall conversion, or even continuously.

The diene-nitrile polymers used in the present invention may have a Mooney viscosity between about 40 and 200, or an intrinsic viscosity between about 0.3 and 3.0, polymers having an intrinsic viscosity between 1 and 1.5 being particularly preferred. The molecular weight M of these polymers may be approximately calculated from the intrinsic viscosity $i_v$ by the following equation: $i_v = 11 \times 10^{-4} \times M^{0.62}$, and for the purpose of the invention polymers having a molecular weight between about 15,000 and 250,000 are generally suitable, the polymers having a molecular weight near the lower limit being obtainable with relatively high concentrations of mercaptan or other similar modifier in the polymerization mixture. Other factors affecting the molecular weight of the polymer are polymerization temperature, nitrile content, Mooney viscosity, etc., as is well known.

As a catalyst, any of a number of oxygen-yielding substances such as hydrogen peroxide, benzoyl peroxide, cumene hydroperoxide, alkali persulfates or perborates, or mixtures thereof, are used. Conveniently, the catalyst may be used in concentrations of about 0.03 to 2 percent based on the weight of reactive monomers, 0.3 to 0.5 percent of potassium persulfate being preferred. Further modification of the polymerization reaction may be accomplished by carrying out the polymerization in a so-called redox system described, for example, in Industrial and Engineering Chemistry, vol. 40, pp. 769–777 and 932–937 (1948). The polymerization is usually carried out at temperatures between about 10 and 70° C., temperatures between 30 and 50° C. being the most common. The polymerization is carried to a conversion of about 60 to 100 percent, preferably about 70 to 95 percent, and takes about 10 to 15 hours, though, depending on the particular polymerization formula selected, polymerization times ranging anywhere between 4 and 24 hours can be worked with if desired, as is well known.

For blending, in accordance with the present invention, the resulting diene-nitrile latex may be used directly as such, or preferably after stripping of residual monomers therefrom, and/or after dispersion therein of desired compounding ingredients such as carbon black, vulcanizing agents, etc. Alternatively, the latex may be coagulated in a known manner by a suitable coagulant such as sodium chloride brine and/or acetic acid, aluminum sulfate and the like, the coagulated polymer separated, washed with water and dried at an appropriate elevated temperature, e. g., at 65 to 100° C. for about 1 to 10 hours in an air oven. The resulting dry polymer is then ready for blending to form the easy processing blends of the invention, hereafter referred to as polyblends.

The other principal component used in the invention is a solid vulcanizable synthetic polydiene rubber consisting preferably of a homopolymerized diolefin having 4 to 6 carbon atoms per molecule such as butadiene, isoprene, piperylene, dimethyl butadiene, or mixtures thereof, or alternatively consisting of a diolefin copolymerized with a relatively small amount of up to about 10 percent of copolymerizable ethylenically unsaturated monomer such as styrene, an acrylic nitrile, an acrylate such as methyl acrylate, methyl methacrylate and other known unsaturated esters, or ketones or the like. The upper limit of the proportion of ethylenically unsaturated comonomer in the polydiene rubber is determined primarily by the fact that for the purposes of the invention the polydiene rubber must be immiscible with the diene-nitrile rubber, i. e., upon mixing, the two rubbers must exist as two distinct phases, no matter how well homogenized. Also, it is desirable to keep the comonomer concentration of the polydiene rubber low so as to retain as much as possible the outstanding low-temperature properties characteristic of synthetic polydiene rubbers. Generally speaking, the proportion of comonomer in the polydiene rubber is so low that it has no significant effect on the blending characteristics of the resulting polymer as compared with a homopolymerized diolefin such as polybutadiene.

Except for the obviously different monomer composition, the preparation of the polydiene rubbers is carried out essentially by the same emulsion polymerization technique described above in connection with the preparation of the diene-nitrile rubbers. The Mooney viscosity of the resulting polydiene rubbers usually ranges between about 5 to 75, while the average molecular weight should be about 25,000 to 275,000, corresponding to an intrinsic viscosity of about 0.6 to 2.75. When such polydiene rubber is vulcanized according to the following recipe: Rubber 100 parts; HPC black 50; dibutyl phthalate 20; zinc oxide 5; stearic acid 1.0; sulfur 2.0; N-cyclohexyl-2-benzothiazole sulfenamide 1.0, it should have a tensile strength of at least 500 and an elongation of at least 150. The iodine number of such polydiene rubbers should be at least about 400.

In working with these rubbers it must be remembered that polydiene rubbers of as low as 5 Mooney viscosity, though seemingly soft, are very difficult to process on a mill or in a Banbury or equivalent mixing equipment, are crumbly when mechanically worked, are extremely slow in forming a hole-free and smooth continuous band with active rolling banks and will not break down appreciably even after prolonged milling on a tight mill.

According to the present invention, it has been found that polymeric diene-nitrile rubbers of surprisingly improved milling and processing characteristics are obtained when they are blended with difficulty workable polydiene rubbers of 5 to 75 or even 90 Mooney viscosity or higher. Blends of particularly good physical properties can be realized by mixing a butadiene-acrylonitrile rubber having a nitrile content of about 35 to 40 percent and a Mooney value of 90 to 135 with polybutadiene having a Mooney value between 15 and 50. Auxiliary liquid plasticizers should be used for polydiene rubbers having a Mooney value above 75, the liquid hydrocarbon oils described in copending application Serial No. 794,811, now Patent No. 2,560,339, of A. M. Gessler being particularly suitable. As suggested above, the blending may be equally well accomplished either by blending the two rubbers in latex form, or by mechanically blending the two rubbers in wet or dry form after coagulation, e. g. in a Banbury where good blending of commercial scale batches can be accomplished in 3 to 10 minutes.

Latex blending is somewhat preferred because it reduces the required number of separate operating steps, and also because the entire step of mechanical blending can thus be eliminated, thereby saving considerable power and also avoiding unnecessary break-down of the two polymers.

The composition of the improved polyblends of desired oil resistance and low-temperature properties can be varied by varying the weight ratio of polydiene rubber to diene-nitrile rubber of given nitrile content and also by varying the nitrile content of the diene-nitrile rubber itself. For example, between about 5 and 70 parts of polydiene rubber may be blended with 95 to 30 parts of a diene-nitrile rubber whose composition in turn may vary from a combined nitrile content of about 15 percent up to 50 or 60 percent. Where optimum oil resistance is the primary desideratum, it is preferable to use blends of between 5 and about 30 parts of polydiene rubber and 95 to 70 parts of diene-nitrile rubber of relatively high nitrile content. For example, an excellent oil resistant composition can be prepared by blending 90 parts of a butadiene-acrylonitrile polymer having a nitrile content of about 35 percent and a Mooney value of about 135, and 10 parts of polybutadiene rubber having a Mooney value of 50.

In accordance with the present invention rubber compositions of polyblends of a wide range of nitrile content can be prepared which have almost the same oil resistance and other desirable properties as a diene-nitrile rubber of the same nitrile content prepared by direct copolymerization of the monomers. At the same time the polyblends have vastly superior processing characteristics, will band almost immediately on a mill, and become sufficiently plastic after being worked for only a half minute on a hand-tightened mill to allow extremely rapid and uniform incorporation of carbon black, auxiliary plasticizers and other compounding ingredients. Without limiting the invention to any particular theory it is suggested that the superior processing characteristics of the novel polyblends which are compared in the following examples with ordinary diene-nitrile rubber are due, among other things, to the fact that the polyblends have almost perfect thermoplastic behavior. Thus they can be rapidly milled to a plastic state where ordinary diene-nitrile rubber must be broken down intra-molecularly to reach a comparable degree of plasticity such as is required for compounding.

In addition, the polyblends have exceptionally good film strength, that is, the uncured stock can be pulled by hand to give strong thin films or taffy-like threads whereas both diene-nitrile rubber and synthetic polydiene rubbers are "short" in the raw state and will break after only slight elongation. It is surmised that this high film strength is due to mutual dilution of the two rubbers in the blend whereby their intermolecular forces are greatly reduced to allow extensive slippage of the molecules whereas the intermolecular forces in diene-nitrile rubber alone are so great that rupture between aggregates of rubber molecules will occur almost as soon as any appreciable molecular slippage is brought about by external forces. The high film strength is apparently the principal factor responsible for the rapid dispersion of compounding ingredients such as carbon black in the polyblends since the aggregates of black become almost immediately enveloped by strong films of the rubber phase without disrupting the continuity of the latter. In contrast, in the case of unblended diene-nitrile polymers and most other synthetic rubbers the initial addition of carbon black actually causes a disruption of the continuous rubber phase because the films of the rubber stock originally formed around the carbon black aggregates are too weak or too elastic and hence pull apart too easily, requiring more time and more energy to form a uniform dispersion of black in the rubber stock.

*Example 1*

A number of butadiene-acrylonitrile latices, containing polymers of 37 percent combined acrylonitrile and varying from 83 to 165 Mooney viscosity were prepared at 35° C. in accordance with the known polymerization recipe described earlier. Portions of these latices were blended with polybutadiene latices, the latter containing solid polymers of 13 to 76 Mooney viscosity, in a weight ratio of 78 parts of butadiene-acrylonitrile polymer to 22 parts of polybutadiene. In each case the latex blends were coagulated by brine and acetic acid, washed and dried in the manner commonly used in isolating synthetic rubbers. The plasticities of the polymers making up these blends and the analyses of the final blends are shown in the following table.

TABLE I

| Blend No. | Mooney viscosity of parent polymers (2 Min.) | | Analyses of final blend | |
|---|---|---|---|---|
| | Diene-nitrile rubber | Polybutadiene | Mooney viscosity (2 min.) | Percent acrylonitrile |
| 1 | 165 | 31 | 135 | 28.75 |
| 2 | 132 | 13 | 75 | 28.6 |
| 3 | 132 | 76 | 95 | 29.2 |
| 4 | 83 | 13 | 51 | 29.3 |
| 5 | 83 | 76 | 79 | 29.0 |

All of the blends described above, as well as intermediates not listed, exhibited excellent milling and processing properties. When the blends were placed on a 6" x 12" laboratory mill and milled under standard conditions (135 grams of polymer, mill rolls set at 0.018" clearance, and temperature controlled at 100° F.) they formed hole-free bands immediately on the first pass through the mill rolls and within one to two minutes further milling the polymer blend was in the form of a smooth glossy sheet with an active rolling bank. When the mill rolls were stopped, the stocks held their continuous bands indicating that the stocks had been well plasticized in the two minutes' mastication time.

In contrast, a commercial butadiene-acrylonitrile rubber having a combined nitrile content of 28 percent prepared by direct emulsion polymerization of the required proportion of monomers in accordance with the normal emulsion technique described above and having a two-minute Mooney viscosity of 50, began to form a continuous band only after one minute's milling under the above conditions, but even after fifteen-minute milling the banded polymer was still rough and "pebbly." When the mill rolls were stopped at this stage the polymer pulled apart on the roll indicating a relatively low degree of plasticity and an undesirably high degree of residual elasticity.

In further contrast to the above-described excellent milling properties exhibited by the polyblends having Mooney viscosities as high as 95 and even 135 (Table I, Blends 3 and 1 respectively), a regular butadiene-acrylonitrile rubber prepared by usual emulsion polymerization and having a combined nitrile content of 28 percent and a Mooney viscosity of 90 required 7 minutes to form a hole-free band and even after 15 more minutes of milling the banded polymer was rough and very elastic, the lack of polymer plasticity being reflected in rapid shrinkage of the stock after it had been cut from the mill rolls.

Example 2

In order to show that the excellent processing properties of the polymer blends illustrated in Example 1 were not obtained at the sacrifice of vulcanizate properties, a number of polymer blends and regular direct-synthesis polymers of comparative nitrile content were cured for 45 minutes at 287° F. using the following typical compounding recipe:

thesis copolymers containing no all-hydrocarbon polymer. The higher tensile properties, including higher modulus, of the polyblends likewise deserve notice. When desired, less "tight" cures, i. e., lower moduli and greater elongations, can be obtained by lowering the sulfur dosage.

It is to be understood, of course, that the novel polyblends need not be vulcanized in accordance with the recipe just disclosed. Similarly good vulcanizates can be obtained with other recipes using other known vulcanizing agents or accelerators such as mercaptobenzothiazole, tetramethylthiuramdisulfide, the carbamates, amino compounds such as diphenyl guanidine, quinone dioxime compounds, as well as usual fillers, antioxidants, pigments and the like.

TABLE II

| Polymer | Polyblends | | | Direct-synthesis copolymer* | | | |
|---|---|---|---|---|---|---|---|
| Run No | (1) | (2) | (3) | (4) | (5) | (6) | (7) |
| Mooney viscosity (large rotor) (2 min. at 212° F.) | 51 | 65 | 83 | 55 | 61 | 84 | 88. |
| Percent acrylonitrile | 29.3 | 30.5 | 29.7 | 28.7 | 29.1 | 29.0 | 29.0. |
| Vulcanizate properties, 45 minute cure at 287° F.: | | | | | | | |
| Tensile, p. s. i | 3,400 | 3,375 | 4,020 | 3,075 | 2,925 | 3,925 | 3,925. |
| Elongation, percent | 575 | 545 | 540 | 610 | 640 | 590 | 580. |
| 300% modulus | 1,780 | 1,735 | 2,040 | 900 | 920 | 1,230 | 1,480. |
| Thiokol bend test: | | | | | | | |
| At −55° F | O. K. | O. K. | O. K. | O. K. | O. K. | O. K. | O. K. |
| At −60° F | Failure | Failure | Failure | Failure | Failure | Failure | Failure. |
| Hydrocarbon solvent resistance**, volume increase, percent. | 43.2 | 42.1 | 41.2 | 43.3 | 42.5 | 41.5 | |

*Commercial Butadiene-Acrylonitrile Rubber (Perbunan-26).
**Test at room temperature. Composition of Hydrocarbon solvent: 20% Aromatics (Benzene, Toluene, Xylene, etc.), 80% disobutylene.
(1) Blend of 78 parts (by weight) of commercial butadiene-acrylonitrile rubber of 37% nitrile content and 83 Mooney, and 22 parts of polybutadiene of 13 Mooney. (Identical with blend 4 of example 1.)
(2) Blend of 78 parts of commercial butadiene-acrylonitrile rubber of 37% nitrile content and 83 Mooney, and 22 parts of polybutadiene of 31 Mooney.
(3) Blend of 78 parts of commercial butadiene-acrylonitrile rubber of 37% nitrile content and 132 Mooney and 22 parts of polybutadiene of 31 Mooney.

Polymer 100 parts, medium processing channel black 50 parts, zinc oxide 5 parts, stearic acid 1.0 part, benzothiazyl disulfide 1.0 part, sulfur 1.5 parts. The Mooney viscosities and nitrile contents of the crude polymers and the properties of the resulting vulcanizates are shown in subsequent Table II. These data indicate that no appreciable loss in any physical properties has resulted from the use of the easy-processing polymers as compared with direct-synthesis polymers of comparative nitrile content and Mooney viscosity.

It seems particularly surprising to note that the oil resistance of the polyblends, despite the presence of polybutadiene therein is substantially as good as that of the comparable direct-syn-

Example 3

The unexpectedly superior processing properties of the novel blends, that is, their desirable reduction in nerve or reversible elasticity can also be demonstrated in an extruder. In this example the samples described in subjoined Table III-A were compared by extruding them in uncompounded form after carefully controlled preliminary mastication of five minutes on a 6″ x 12″ laboratory mill set at 0.018″ clearance. The raw stocks were extruded at 220° F. and at a screw speed of 80 R. P. M. through a 0.400″ inside diameter die with a 0.300″ outside diameter core, giving a theoretical tube wall thickness of 0.05″. The extrusion rates and characteristic properties of the extruded tubes, are summarized below:

TABLE III-A

| Polymer | (1) | (2) | (3) | (4) |
|---|---|---|---|---|
| Mooney viscosity at 212° F | 83 | 17 | 51 | 53. |
| Extrusion rate: | | | | |
| Inches/minute | 36 | 32 | 53 | 37. |
| Grams/minute | 108 | 109 | 122 | 106. |
| Measurements of extruded tube: | | | | |
| Unit weight grams/inch | 3.0 | 3.4 | 2.3 | 2.9. |
| Unit volume cc./inch* | 3.1 | 3.5 | 2.4 | 3.0. |
| Elastic swell**, volume percent | 245 | 290 | 165 | 235. |
| Appearance of tube | Rough and dull | Very rough and dull. | Smooth and glossy. | Rough and dull. |

* The unit volume was calculated from unit weight, assuming an average specific gravity of 0.96.

** The elastic swell is calculated from the formula $\frac{V-0.9}{0.9}$, V being the actual volume of a one-inch length of extruded tube while 0.9 is the calculated ideal volume of a one-inch length of a tube having a cross-section corresponding exactly to the dimensions of the die orifice.
(1) Direct-synthesis butadiene-acrylonitrile rubber; nitrile content 37.1%.
(2) Polybutadiene rubber.
(3) Blend of 78 parts of (1) and 22 parts of (2); average nitrile content 29.3%.
(4) Direct-synthesis butadiene-acrylonitrile rubber; nitrile content 29%.

The data of Table III-A show conclusively that a blend of superior characteristics can be obtained by mixing the very poorly processing polybutadiene rubber into the poorly processing nitrile rubber, a result entirely unpredictable from the properties of the individual polymeric blend constituents. The data show that the blend of the invention has an extrusion rate which in terms of inches per minute is more than about 50 percent faster than the comparative rate of either constituent, and almost as much faster than the rate of a direct-synthesis polymer having approximately the same Mooney viscosity and nitrile content as the blend.

The superior characteristics of the novel blends are further shown by a comparison of the respective elastic swell values, the blend of the invention having a swell of 166 volume percent based on the volume of an ideal tube having a cross-section exactly corresponding to the die dimensions whereas both of its components as well as an otherwise comparable direct-synthesis polymer had elastic swell values substantially above 290 percent, the swell value of the polybutadiene tube being close to 300 percent, corresponding to a cross-section almost four times as large as the die opening. Finally, the smoothness and glossiness of the novel blends when extruded, as compared to the roughness and dullness of the other extruded polymers, is a striking indication of the effective plasticization and surprising improvement in processing characteristics obtained by the addition of the highly elastic polybutadiene rubber to the nitrile rubber.

Similarly, favorable results can be obtained even with much less plastic polymers, that is, with polymers having a much higher Mooney viscosity than those described in Table III-A. This is illustrated by the data of Table III-B.

As in Table III-A discussed earlier, the data of Table III-B indicate a similar improvement in plastic properties of the novel high-Mooney blends as compared with the other polymers tested. Indeed, the difference appears to be even more strongly in favor of the novel blends prepared from high Mooney polymers than in the case of the lower Mooney polymers described in Table III-A.

Examples 4–7

A very practical advantage of the novel blends is the surprisingly short time required by them to form a continuous band on milling. As a consequence of this shortened "band time," the novel blends can be broken down and compounded in a much shorter time than had ever been thought possible for this or almost any other type of rubbery polymer. This is illustrated by Table IV which summarizes the banding time of various known butadiene-acrylonitrile emulsion polymers identified in the table as "nitrile rubbers," as well as of various polybutadiene rubbers and of blends of the aforesaid two types of rubber. The banding time was measured at $100 \pm 5°$ F. under carefully controlled, reproducible conditions, working with 135 grams of individual polymer or latex-mixed polymer blend on a 6-inch laboratory mill with speed ratio of 1 to 1.4 and having the rolls adjusted exactly to a clearance of 0.018 inch. The "ML" values in the table represent 2-minute Mooney viscosity readings at 212° F. employing a large rotor.

TABLE IV

| Example No. | Polymer | Percent $C_3H_3N$ | ML | Band time (minute) | Appearance of band and bank |
|---|---|---|---|---|---|
| 4 | A. Nitrile rubber | 37.0 | 83 | 1.5 | Rough, pebbly. |
|  | B. Polybutadiene | 0.0 | 76 | >15.0 | Crumbly, dry. |
|  | C. Blend (78 parts A, 22 parts B) | 29.2 | 80 | 0.2 | Smooth, shiny stock; active bank. |
|  | D. Nitrile rubber | 28.9 | 86 | 5.0 | Rough, pebbly. |
| 5 | A. Nitrile rubber | 35.9 | 165 | 4.0 | Very rough and pebbly. |
|  | B. Polybutadiene | 0.0 | 31 | >15.0 | Crumbly, dry. |
|  | C. Blend (78/22) | 28.8 | 135 | 0.2 | Smooth; even and active bank. |
|  | D. Nitrile rubber | 29.0 | 121 | 8.5 | Very rough and pebbly; bank uneven. |
| 6 | A. Nitrile rubber | 28.8 | 78 | 5.0 | Rough, pebbly. |
|  | B. Polybutadiene | 0.0 | 76 | >15.0 | Dry, crumbly. |
|  | C. Blend (75/25) | 21.8 | 74 | 0.5 | Fairly smooth; active, even bank. |
|  | D. Nitrile rubber | 22.0 | 77 | 15.0 | Rough, pebbly; uneven bank. |
| 7 | A. Nitrile rubber | 29.0 | 99 | 6.0 | Very rough, pebbly. |
|  | B. Polybutadiene | 0.0 | 31 | >15.0 | Dry, crumbly. |
|  | C. Blend (75/25) | 22.5 | 70 | 0.5 | Fairly smooth; active bank. |
|  | D. Nitrile rubber | 22.0 | 77 | 15.0 | Rough, pebbly; uneven bank. |

All of the above examples again show the greatly superior mill behavior of the novel polyblends of various plasticity levels and nitrile contents, not only as compared with copolymers directly synthesized to the same nitrile content and plasticity, but even more so when compared with the individual polymers constituting the

TABLE III–B

| Polymer | (1) | (2) | (3) | (4) |
|---|---|---|---|---|
| Mooney viscosity | 165 | 31 | 135 | 135. |
| Nitrile content, percent | 36 | 0 | 28.9 | 29. |
| Extrusion rate, inches/minute | 52.5 | 32 | 60.5 | 34. |
| Swelling index, grams/inch | 2.75 | 3.4 | 1.75 | 2.9. |
| Elastic swell, volume percent | 215 | 290 | 105 | 235. |
| Appearance | Very rough, misshaped | Very misshaped | Fairly smooth, tubular | Very rough, misshaped. |

(1) Direct-synthesis butadiene-acrylonitrile rubber.
(2) Polybutadiene.
(3) Blend of 78 parts of (1) and 22 parts of (2).
(4) Direct-synthesis butadiene-acrylonitrile rubber.

blends. Not only is the behavior of the polyblends better than would be expected by averaging the behavior of the individual constituents, but quite surprisingly the mill-behavior of the polyblends is outstandingly good and actually far better than the behavior of either of the constituents which vary in processability from fair to very poor.

It is also significant to observe that within the limits described earlier, the polyblends possess favorable processing characteristics regardless of plasticity and nitrile content whereas the processability of directly synthesized nitrile rubbers has been known to grow inferior with an increase in Mooney viscosity as well as with a decrease in nitrile content. Hence, it follows that the difference in mill-behavior becomes particularly great in favor of the novel polyblends at high Mooney levels and at low nitrile contents. In this connection it is particularly interesting to observe the excellent mill-behavior of the low-nitrile blends of Examples 6C and 7C as compared to the directly copolymerized control rubbers of Examples 6D and 7D which are notorious for their exceptionally poor processing properties. Examples 4 and 6 also deserve close attention since the component rubbers, the control rubbers as well as the polyblends have essentially identical plasticities, thereby illustrating especially clearly the superiority of the polyblends as compared to other rubbers of similar plasticity.

*Example 8*

When the typical polyblend of Example 4C described above was milled for 1.5 to 2.0 minutes after formation of the continuous band, the stock was smooth, thermoplastic and ready for compounding. Thereafter the time required for adding 50 weight percent of channel black to the polymer blend was 1 and 2 minutes respectively in two duplicate runs.

By contrast, when the comparable directly synthesized nitrile copolymer of Example 4D was milled for 1.5 to 2.0 minutes after banding, the stock remained rough, pebbly and unduly elastic, with little evidence of breakdown and no appreciable change in appearance or elastic properties even after 15 more minutes of milling. The time required for adding 50 weight percent of carbon black to this copolymer was 5 and 8 minutes respectively in two duplicate runs, as compared with the time of one to two minutes required with the comparable polyblend as just described.

In a similar test the time required for adding 20 weight percent of dibutyl phthalate plasticizer to the polyblend of Example 4C varied between 1 and 2 minutes, while it took 5 to 10 minutes to incorporate the same proportion of dibutyl phthalate into the copolymer of Example 4D.

*Example 9*

Whereas in previous examples the novel polyblends were prepared by mixing the component polymers in latex form, the polyblend of Example 9 was prepared by blending the previously coagulated component polymers in bulk form on a mill: 78 parts of a butadiene-acrylonitrile copolymer having a nitrile content of 37 percent and a Mooney viscosity of 87 was put on a mill simultaneously with 22 parts of rubbery polybutadiene having a Mooney viscosity of 17, the mill temperature being controlled at 90 to 100° F. On one pass through the mill a polyblend was formed having a Mooney viscosity of 55. This polyblend banded instantaneously and within one minute gave a smooth glossy sheet with an active bank. When extruded, this mill-mixed blend gave an extrusion rate of 55.0 inches per minute, unit extrusion weight 2.34 grams/inch, unit extrusion volume 2.44 cc./inch and an elastic swell of 170 volume percent; the appearance of the tube was smooth. When these results are compared with those of the similar latex-blended compound 3 of Table III–A, it will be observed that the results are virtually identical. This shows that the favorable processing properties of the novel polyblends are independent of the blending technique used in their preparation. The superiority of the mill-mixed polyblends can be seen from a comparison of the above results with those obtained on the comparable direct-synthesis copolymer 4 of table III–A.

*Example 10*

When the polyblend of Example 9 was compounded on a mill with carbon black, it was found that 20 to 200 parts of black could be uniformly dispersed in 100 parts of polyblend in surprisingly short times ranging from 3 to 10 minutes depending on the amount of black added. Even more effective compounding was effected in a Banbury mixer wherein good blending and good carbon black dispersion were obtained in 3 to 10 minutes from the time when the individual component polymers and the black were charged to the mixer. In some instances still more rapid compounding was obtained by adding the ingredients to the Banbury in the following specific sequence of steps: First add all of the diene-nitrile rubber and about half of the total amount of carbon black into the mixer, then add the polydiene rubber and finally the remainder of carbon black.

It will be understood that the foregoing examples have been adduced merely as illustrations, but that the invention is not limited thereto. So the method of blending the rubbers in latex form has been chosen in most examples primarily for theoretical reasons so as to allow direct quantitative comparison of plasticity values by reducing to a minimum such variations in Mooney viscosity measurements as might be introduced by limited but variable extent of polymer breakdown when the different polymers are blended in compact form, e. g., on a mill or in a Banbury. From a practical point of view such mechanical blending has been found to be very rapid and equally feasible as latex blending and the results of Example 9 show that mill-mixed polyblends possess essentially the same superior properties as the latex-blended polyblends. The eventual choice of blending method is entirely within the discretion of the operator using the present invention, latex blending being recommended merely from the point of view of simplicity where the rubbers are easily available in latex form. Also, it is to be understood that instead of using polybutadiene, similar diolefin rubbers described in another part of this specification can be used to equal advantage. Likewise as earlier described, the nitrile rubber may be a copolymer of other monomers than butadiene and acrylonitrile. Other modifications or variations falling within the scope of the present invention are described or suggested at various parts hereof and still others will readily be thought of by persons skilled in the art.

The invention is particularly defined in the following claims:

1. An oil-resistant rubber composition having a swelling index of less than 2.5 under standard conditions and consisting of 50 to 85 parts by weight of a rubbery emulsion copolymer of 60 to 75 weight percent of butadiene-1,3 and of 40 to 25 weight percent of acrylonitrile, said rubber emulsion copolymer having a Mooney viscosity between 40 and 200; and 50 to 15 parts by weight of a vulcanizable, emulsion-polymerized rubber-like homopolymer of a conjugated $C_4$ to $C_5$ diolefin, said homopolymer being characterized by a Mooney viscosity between 17 and 75.

2. A vulcanized, oil-resistant rubber composition consisting of 50 to 85 parts by weight of a rubbery copolymer of 60 to 75 weight per cent of butadiene-1,3 and of 40 to 25 weight percent of acrylonitrile, said rubbery emulsion copolymer having a Mooney viscosity between 40 and 200; 50 to 15 parts by weight of an emulsion-polymerized vulcanizable rubbery polybutadiene having a Mooney viscosity between 17 and 50; and minor amounts of sulfur and vulcanization accelerator.

3. A process for preparing uniform dispersions of carbon black in oil-resistant rubber consisting in mixing 35 to 95 parts by weight of butadiene-acrylonitrile rubber, having a Mooney viscosity between 40 and 200; and 65 to 5 parts by weight of vulcanizable, rubbery, emulsion-polymerized polybutadiene having a Mooney viscosity between 17 and 75, and 20 to 200 parts of carbon black in a mixing cycle ranging from 3 to 10 minutes.

4. A process consisting of the steps in combination of mixing a latex containing 50 to 85 weight units of a rubbery butadiene-acrylonitrile copolymer having a combined nitrile content of 15 to 40 weight percent and a Mooney viscosity between 40 and 200 with a latex containing 50 to 15 weight units of vulcanizable, emulsion-polymerized, rubbery polybutadiene, characterized by a Mooney viscosity between 17 and 85; coagulating the resulting mixture; and washing and drying the coagulated blend.

FRED W. BANES.
ALBERT M. GESSLER.
WILBUR F. FISCHER.

References Cited in the file of this patent

UNITED STATES PATENTS

| Number | Name | Date |
|---|---|---|
| 2,381,248 | Bascom | Aug. 7, 1945 |
| 2,397,050 | Sarbach | Mar. 19, 1946 |
| 2,514,194 | Cline | July 4, 1950 |
| 2,545,516 | Gessler | Mar. 20, 1951 |
| 2,560,339 | Gessler | July 10, 1951 |

FOREIGN PATENTS

| Number | Country | Date |
|---|---|---|
| 492,998 | Great Britain | Sept. 30, 1938 |
| 705,104 | Germany | Apr. 17, 1941 |

OTHER REFERENCES

Stocklin, pp. 51, 52, 58, 59 and 60, Institution of the Rubber Industry, Transactions, vol. 15, June 1939.

Meyer, "Natural and Synthetic High Polymers," pgs. 22–23, pub. by Interscience Publishers, New York (1942).

Liska, Ind. & Eng. Chem., pp. 40–46, January 1944.

Baldwin et al., Rubber Age, pp. 433–435, February 1944.

McMillan et al., India Rubber World, pp. 663–669 and 714, February 1946.

Chemical Engineering, December 1947, p. 180.